Figure 1:
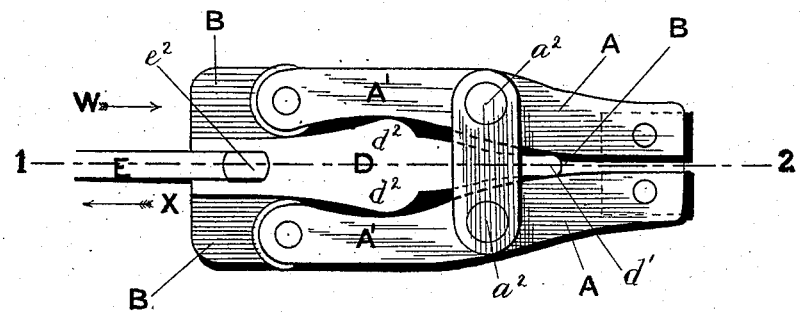

(No Model.)

R. WOOTTON & B. HEWITT.
F. L. MIDDLETON, ancillary Administrator of B. HEWITT, Deceased.
DOG OR GRIPPER FOR USE ON DRAW BENCHES.

No. 577,095. Patented Feb. 16, 1897.

Witnesses
H. van Oldenneel
E. A. Scott

Inventors
Robert Wootton
Frank L. Middleton

Attorneys

THE NORRIS PETERS CO., PHOTO-LITHO., WASHINGTON, D. C.

UNITED STATES PATENT OFFICE.

ROBERT WOOTTON, OF BIRMINGHAM, ENGLAND, AND FRANK L. MIDDLETON, OF WASHINGTON, DISTRICT OF COLUMBIA, ANCILLARY ADMINISTRATOR OF BENJAMIN HEWITT, DECEASED, ASSIGNORS TO THE BRITISH TUBE COMPANY, LIMITED, OF BIRMINGHAM, ENGLAND.

DOG OR GRIPPER FOR USE ON DRAW-BENCHES.

SPECIFICATION forming part of Letters Patent No. 577,095, dated February 16, 1897.

Application filed May 19, 1896. Serial No. 592,236. (No model.) Patented in England April 14, 1894, No. 7,453.

*To all whom it may concern:*

Be it known that I, ROBERT WOOTTON, a subject of the Queen of England, and a resident of Birmingham, England, did invent jointly with BENJAMIN HEWITT, deceased, late of Birmingham, England, an Improved Dog or Gripper for Use upon Draw-Benches, of which the following is a specification.

The invention has been patented in England, No. 7,453, dated April 14, 1894.

Our invention has for its object an improved dog or gripper for use on draw-benches, by which the tag of the tube or rod has an equal grip along its full length whether the tag be taper or parallel, while the rod or tube is always drawn true and square to the die. The action of our dog or gripper also obviates any sudden jerk when the tube is gripped, being at the same time direct in its action when gripping.

In carrying our invention into effect we pivot a pair of jaws upon a carriage, between which jaws we mount a double wedge having a dual action, *i. e.*, upon the wedge being operated in one direction the mouth of the jaws is opened by the action of the one end of the wedge upon the front part of the jaws, while the operation of the wedge in the opposite direction closes the mouth of the jaws by reason of the other end of the wedge acting upon the rear arms of the pivoted jaws. The clutch for engaging with the draw-chain is mounted in the wedge and is crank-shaped, the one or horizontal edge having the notched end for clutching the chain, while the other or vertical end rises up in the form of an arm, by the knocking over of which the notch is raised from its engagement with the chain, the same action carrying the wedge along and thereby opening the jaws. Upon the dog or grip being placed in position for gripping the tube the crank-handle is brought back and the clutch end dropped into engagement of the chain, when the other end of the wedge comes into action and causes the jaws to grip the tube. A gripping-piece is pivoted at the front of each jaw, which gripping-piece is serrated and shaped to fit the tube, and by reversing these blocks upon their pivots a different-sized tube may be gripped without changing the pieces, while the pivoted pieces adapt their position to any incline upon the tube and thereby obtain an even grip along the whole length of the tag. To obviate friction we may provide rollers in the arms and jaws in such position as to receive the action of the wedge.

In order that our invention may be clearly understood and more easily carried into practice, we have appended hereunto a sheet of drawings upon which we have fully illustrated the nature of our said improvements together with the mode of carrying the same into effect.

Figure 2:
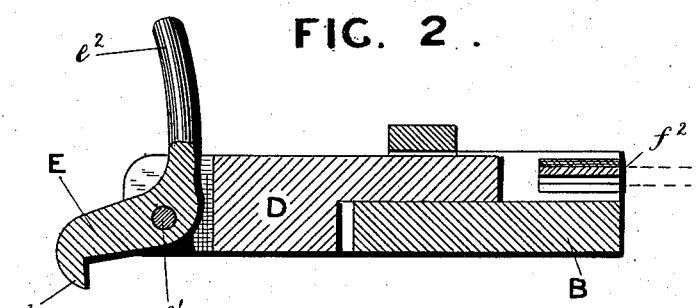
Figure 3:
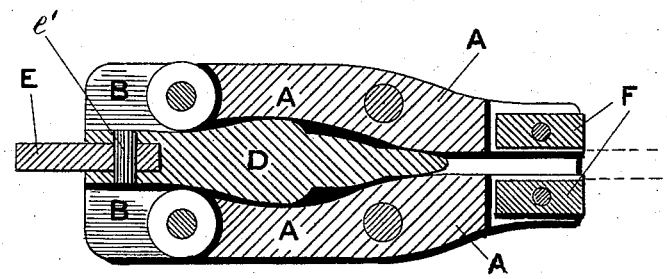

Figure 1 is a plan of our dog or gripper. Fig. 2 is a section on line 1 2. Fig. 3 is a sectional plan of same.

Figure 4:
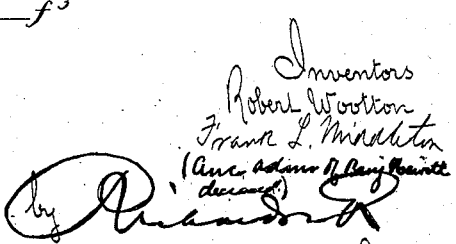

Our invention has for its object an improved dog or gripper; and it consists of a pair of jaws A A, which are pivoted upon the carriage B at $a^2$ and are provided with the lever-arms A' A'. Between these jaws and arms the wedge D is mounted, so as to have a dual sliding action, so that when the wedge is operated or carried in the direction of the arrow W the jaws A A are opened by reason of the action of the point $d'$ of the wedge against the jaws A, while the operation of the wedge by the draw-chain in the direction of the arrow X causes the jaws A to grip the tube, which is effected by the action of the wings $d^2$ of the wedge D. The pawl-lever E for engagement with the draw-chain is pivoted to the wedge D at $e'$, and is provided with the handle $e^2$ and clutch $e^3$, the latter for engaging with the draw-chain and the former for allowing of the knocking up of the clutch and the consequent disengagement from the chain, which action at the same time draws the wedge D back and thereby releases the tube, as before described. Upon the dog or grip being placed in position for gripping the tag the crank-handle $e^2$ is operated so as to drop the clutch $e^3$ into engagement with the draw-chain, which action brings the wings $d^2$ of the wedge D into action and causes the jaws to immediately grip the tag. A gripping-nose F is pivoted at the front of each jaw, being serrated and shaped to grip the tube at $f^2$. By the reversal of these blocks F upon their pivots various-sized tubes may be gripped without changing the blocks, as shown by Fig. 4. The pieces F being pivoted, also, to adapt themselves to any bend in the tube and thus obtain an even grip along the whole length of tube, the gripping-lever E may be made to act by the vertical action of the arm $e^2$ in place of the horizontal motion when necessary.

What we claim, then, is—

1. A gripping-dog for draw-benches, comprising a pair of pivoted levers having gripping-jaws at one end and means for opening and closing the said levers with the jaws consisting of a wedge between the rear ends of the levers, said wedge having a point $d'$ to enter between the levers beyond their pivoted points, and having the faces $d^2$ in rear of said pivots to act upon the rear ends of the levers to spread them, when the wedge is retracted, substantially as described.

2. A gripping-dog comprising levers pivoted intermediately of their ends, having gripping-jaws at one end and a wedge arranged to engage the opposite ends of the levers and having a point entering between said levers beyond their pivotal point and a pawl pivoted to said wedge, substantially as described.

3. In combination, the gripper-levers, the wedge having a portion arranged to engage the rear ends of the levers and a point arranged to engage said levers beyond the pivoted points and the clutch-lever carried by the wedge having a hook $e^3$ and an arm $e^2$, substantially as described.

In witness whereof we have hereunto set our hands in the presence of two witnesses.

ROBERT WOOTTON.
FRANK L. MIDDLETON,
*Admr.*

Witnesses as to signature of Robert Wootton:

HARRY LANGSLOW,
ALBERT E. OCKFORD.

Witnesses as to signature of Frank L. Middleton:

JAMES M. SPEAR,
R. E. OURAND.